United States Patent
Kim et al.

(10) Patent No.: US 7,856,841 B2
(45) Date of Patent: Dec. 28, 2010

(54) AIR CONDITIONING SYSTEM FOR AUTOMOBILE

(75) Inventors: Young-Cheol Kim, Daejeon-si (KR); Yong-Sik Kim, Daejeon-si (KR)

(73) Assignee: Halla Climate Control Corp., Daejeon-si (KR)

( * ) Notice: Subject to any disclaimer, the term of this patent is extended or adjusted under 35 U.S.C. 154(b) by 731 days.

(21) Appl. No.: 11/460,009

(22) Filed: Jul. 26, 2006

(65) Prior Publication Data

US 2007/0023162 A1 Feb. 1, 2007

(30) Foreign Application Priority Data

Jul. 28, 2005 (KR) ............... 10-2005-0069081

(51) Int. Cl.
F25D 21/14 (2006.01)
B60H 1/32 (2006.01)
B60H 3/00 (2006.01)
B60H 1/00 (2006.01)

(52) U.S. Cl. ............... 62/285; 62/244; 165/42; 165/202

(58) Field of Classification Search ............... 62/244, 62/285; 165/202, 42
See application file for complete search history.

(56) References Cited

U.S. PATENT DOCUMENTS

2004/0040330 A1* 3/2004 Kosaka ............... 62/285
2004/0089006 A1* 5/2004 Kamiya et al. ............... 62/244
2004/0148953 A1* 8/2004 Kurata et al. ............... 62/244
2004/0194912 A1* 10/2004 Honda ............... 165/42
2005/0048910 A1* 3/2005 Lindner ............... 454/334

FOREIGN PATENT DOCUMENTS

JP 2002274162 9/2002
KR 1999-0038154 10/1999

OTHER PUBLICATIONS

"Grace Manufacturing", Jul. 27, 2004, found at website http://web.archive.org/web/20041015004533/www.grace-mfg.com/jlockrings.htm, used http://www.archive.org/web/web.php.*

* cited by examiner

Primary Examiner—Thomas E. Denion
Assistant Examiner—Michael Carton
(74) Attorney, Agent, or Firm—Lowe Hauptman Ham & Berner LLP

(57) ABSTRACT

An air conditioning system for an automobile prevents leakage of condensed water by locating two drain parts respectively on an air conditioning case and a protective cover having a drain structure beneath the air conditioning case. A drain hose, connected to and communicating with the drain parts, discharges the condensed water to the outside of the automobile without dispersion of the condensed water by forming a condensed water discharge pipe positioned on the protective cover. The protective cover, mounted on the bottom surface of the air conditioning case, surrounds the inflow and outflow pipes and has an auxiliary drain part formed at a side thereof. The drain hose connects the drain part of the air conditioning case with the auxiliary drain part of the protective cover.

6 Claims, 6 Drawing Sheets

AIR CONDITIONING SYSTEM FOR AUTOMOBILE

RELATED APPLICATIONS

The present application is based on, and claims priority from, KR Application Number 10-2005-0069081, filed Jul. 28, 2005, the disclosure of which is hereby incorporated by reference herein in its entirety.

BACKGROUND OF THE INVENTION

1. Field of the Invention

The present invention relates to an air conditioning system for an automobile, and more particularly, to an air conditioning system for an automobile that drain parts respectively formed on an air conditioning case and on a protective cover having a drain structure formed beneath the air conditioning case are connected and so connected as to communicate with each other via a drain hose, thereby preventing leakage of condensed water. The present invention also relates to an air conditioning system for an automobile which has a condensed water discharge pipe formed at a predetermined position of the protective cover, thereby easily discharging condensed water to the outside of the automobile without dispersion of the condensed water.

2. Background Art

In general, an air conditioning system for an automobile includes a cooling device for cooling the inside of the automobile and a heating device for heating the inside of the automobile. The cooling device cools the inside of the automobile through the steps of compressing refrigerant by a compressor actuated by driving force of an engine and sending the refrigerant to a condenser, condensing the refrigerant inside the condenser by air introduced a cooling fan, passing the refrigerant through a receiver drier, an expansion valve and an evaporator in order, thermally exchanging the air blown by a blower unit mounted on an entrance of an air conditioning case with the refrigerant passing through the evaporator while the refrigerant is returned to the compressor, and discharging the cooled air to the inside of the automobile. The heating device heats the inside of the automobile through the steps of thermally exchanging the air blown by the blower unit with cooling water passing through the heater core while the cooling water of the engine is returned to the engine through a heater core, and discharging the heated air to the inside of the automobile.

As shown in FIG. 1, the conventional air conditioning system for the automobile includes: an evaporator 11 and a heater core 12 respectively mounted on the upstream side and the downstream side of an air flow channel inside an air conditioning case 10; a temperature door 13 mounted between the evaporator 11 and the heater core 12 for adjusting temperature of the air to be discharged to the inside of the automobile according to an opening and closing amount; a defrost vent 14, a face vent 15 and a floor vent 16 respectively formed at an outlet end of the air conditioning case 10 in order to discharge conditioned cool air/hot air to the inside of the automobile according to opening and closing of the temperature door 13; and a defrost door 17, a face door 18 and a floor door 19 for selectively adjusting an amount of the cool air/hot air to be discharged through the vents 14, 15 and 16.

Meanwhile, a blower unit case 20 is mounted on an entrance of the air conditioning case 10, and a blower 22 actuated by power transmitting means 21 such as a motor is mounted inside the blower unit case 20. Moreover, an inside air inlet 23 and an outside air inlet 24 are mounted on the upper portion of the blower unit case 20 for inflow of the inside air and the outside air. The inlets 23 and 24 can be adjusted in their opening and closing amount according to rotation of an inside and outside air converting door 25.

By such configuration, when the blower 22 is rotated by operation of the power transmitting means 21, the air is flown in through the inside air inlet 23 and the outside air inlet 24 selectively opened by rotation of the inside and outside air converting door 25, so that the air is cooled or heated during selectively passing the evaporator 11 or the heater core 12 by the temperature door 13 while being blown to the air flow channel inside the air conditioning case 10. As described above, the cooled or heated air is supplied to right and left side areas (namely, a driver's seat and a passenger's seat) inside the automobile at uniform temperature through the vents 14, 15 and 16 by the opening and closing action of the doors 17, 18 and 19, thereby heating and cooling the automobile commonly.

Meanwhile, in case of a large-sized automobile, the air conditioning system further includes a front air conditioning device mounted on the front part of the automobile, and a rear air conditioning device mounted on the rear part for adjusting the inside temperature of the rear part of the automobile and operated through an air conditioning process similar to the front air conditioning device. That is, since a heat exchanger is mounted on a flow channel in which working fluid flows, the heat exchanger executes heat exchange with the outside air when the working fluid passes inside the heat exchanger, so that the outside air is cooled or heated and the cooled or heated air is blown to the rear inside the automobile by a blower unit.

As shown in FIG. 2, the above air conditioning system for an automobile includes an air conditioning case 100. The air conditioning case 100 includes: an air inlet 101 mounted at an entrance thereof for inflow of the air; an air outlet 104 mounted at an exit end thereof for discharge of the air to each part inside the automobile; and an air flow channel extending from the air inlet 101 to the air outlet 104.

Moreover, at predetermined positions of the air inlet 101 and the air outlet 104, mounted are a temperature door D1 for adjusting the inside temperature of the automobile, a defrost door D2 which is a mode door for adjusting an air blast mode which will be described later, a face door D3, and a floor door D4.

The air outlet 104 is to provide cool air/hot air according to the air flow channel, and includes: a defrost vent 104a for discharging the air toward the front window inside the automobile; a face vent 104b for discharging the air toward the driver's upper part inside the automobile, and a floor vent 104c for discharging the air toward the driver's lower part inside the automobile, whereby the air outlet 104 can serve for air-conditioning inside the automobile.

On entrances of the vents 104a, 104b and 104c for air-conditioning of the automobile, respectively mounted are the defrost door D2, the face door D3 and the floor door D4 for selectively adjusting an amount of cool and hot air to be discharged through the vents 104a, 104b and 104c according to opening and closing of the temperature door D1 between a heater core 105 and an evaporator 106, which are respectively mounted on the upstream and downstream sides of the air flow channel inside the air conditioning case 100 for cooling and heating the automobile.

Furthermore, a blower unit (not shown) is mounted on the upper part of the evaporator 106 for blowing the conditioned air backwardly inside the automobile. The air conditioned by the evaporator 106 is discharged backwardly inside the automobile by the blower unit along piping.

That is, when the air conditioning system is operated, heat exchange medium executes heat exchange with the outside air while flowing inside the heater core 105 and the evaporator 106, whereby the conditioned outside air is supplied to the inside of the automobile so as to heat and cool the inside of the automobile.

In addition, when the outside air of low temperature is conditioned by heat exchange medium inside the evaporator 106, condensed water is generated on the outer surface of the evaporator 106 while the outside air is condensed. To collect and discharge the condensed water to the outside of the automobile, the rear air conditioning system has a condensed water discharge pipe 107 formed on the lower part of the air conditioning case 100, and the condensed water discharge pipe 107 is connected with a drain hose 109 extending to the outside of a panel 108 of the automobile.

Meanwhile, if there is a long distance between the condensed water discharge pipe 107 of the air conditioning case 100 and a drain hole 108a formed at a predetermined position of the panel 108 of the automobile, generally, the drain hose 109 is mounted on the condensed water discharge pipe 107 of the air conditioning case 100 and extends to the drain hole 108a of the panel 108. After that, a rubber is mounted in order to prevent leakage of condensed water.

However, it sometimes occurs that a part of the condensed water is not discharged to the condensed water discharge pipe 107 but dispersed toward a ventilation duct (not shown) after being mixed with the air flowing from the blower unit. Particularly, such phenomenon frequently occurs at an end portion of the evaporator 106 relatively nearer to the ventilation duct.

As described above, an end of the condensed water dispersed to the inside of the ventilation duct is connected with the ventilation duct and the other end flows to the inside of a piping hose (not shown) connected into the automobile so as to remain and be spoiled inside the piping hose. Such phenomenon causes generation of bad smell inside the automobile, and finally, the air conditioning system cannot provide the passengers and driver with agreeable air conditioning environment.

Additionally, the prior art air conditioning system for the automobile has a problem in that it causes an increase of manufacturing costs since the drain hose 109 is mounted for connecting the condensed water discharge pipe 107 of the air conditioning case 100 with the drain hole 108a of the panel 108 and a sealing member 110 such as the rubber must be additionally mounted for sealing between the drain hole 108a of the panel 108 and the drain hose 109 fit to the drain hole 108a.

SUMMARY OF THE INVENTION

Accordingly, to solve the above disadvantages of the prior arts, it is an object of the present invention to provide an air conditioning system for an automobile that drain parts respectively formed on an air conditioning case and on a protective cover having a drain structure formed beneath the air conditioning case are connected and so connected as to communicate with each other via a drain hose, thereby preventing leakage of condensed water, overcoming restriction in layout, and increasing productivity through reduction of manufacturing costs.

It is another object of the present invention to provide an air conditioning system for an automobile, which has a condensed water discharge pipe formed at a predetermined position of the protective cover so as to prevent dispersion of condensed water and easily discharge the condensed water to the outside of the automobile, thereby providing a driver and passengers with an agreeable air conditioning environment.

To accomplish the above objects, according to the present invention, there is provided an air conditioning system for an automobile, which includes an air conditioning case having an air inlet formed on an entrance thereof, an air outlet formed on an exit end thereof, and a drain part formed at a predetermined position of the lower part thereof for discharging condensed water; a heater core and an evaporator mounted on an air flow channel inside the air conditioning case and having inflow and outflow pipes for heat exchange medium, the air conditioning system including: a protective cover mounted on the bottom surface of the air conditioning case for surrounding the inflow and outflow pipes and having an auxiliary drain part formed at a side thereof; and a drain hose for interconnecting the drain part of the air conditioning case with the auxiliary drain part of the protective cover.

Moreover, the protective cover includes a condensed water discharge pipe formed at a side of the auxiliary drain part in such manner as to be vertically perforated at the center thereof and protruded outwardly.

Furthermore, the protective cover includes a pair of guide holes formed on sides of the first and second containing parts for guiding and exposing bent end portions of the inflow and outflow pipes to the outside.

Additionally, the auxiliary drain part and the condensed water discharge pipe of the protective cover are so connected as to communicate with each other.

In addition, the auxiliary drain part and the condensed water discharge pipe are injection-molded integrally with the protective cover.

Moreover, the drain hose is formed integrally with the drain part or the auxiliary drain part when the protective cover or the air conditioning case is injection-molded.

In addition, the drain part is arranged at the same height as the auxiliary drain part or at a higher position than the auxiliary drain part, whereby the condensed water flows from the drain part to the auxiliary drain part by its self-weight.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 1:
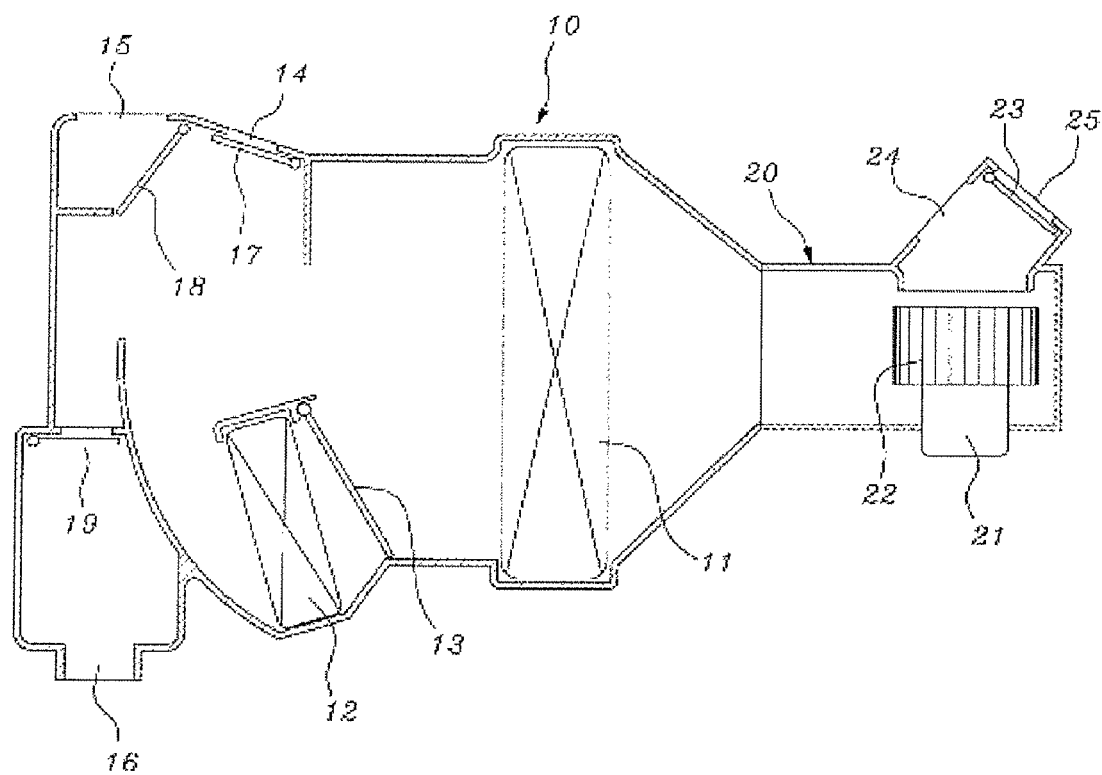
FIG. 1 is a brief structural view of a prior art air conditioning system for an automobile.
Figure 2:
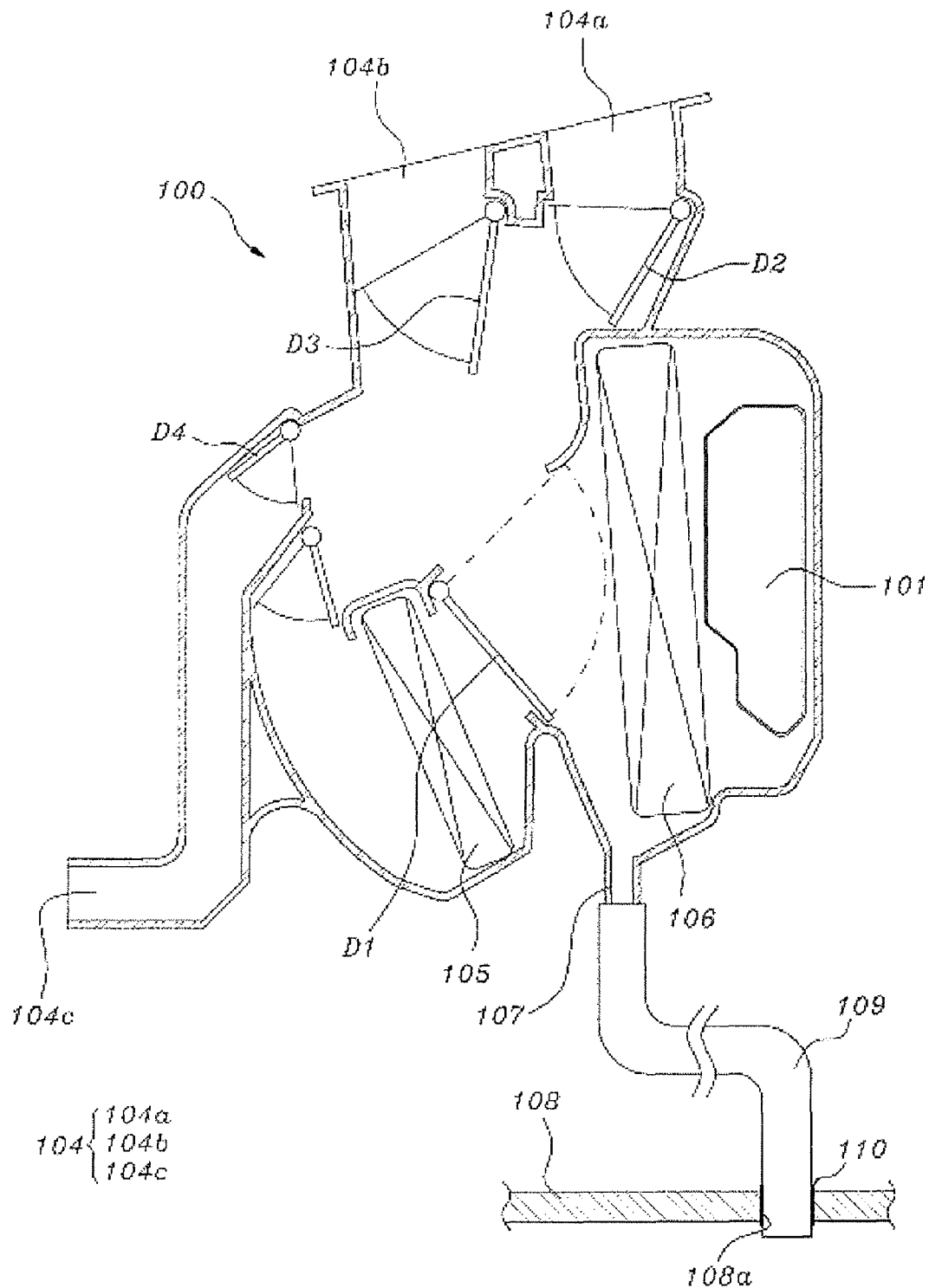
FIG. 2 is a side sectional view of the prior art air conditioning system for the automobile.
Figure 3:
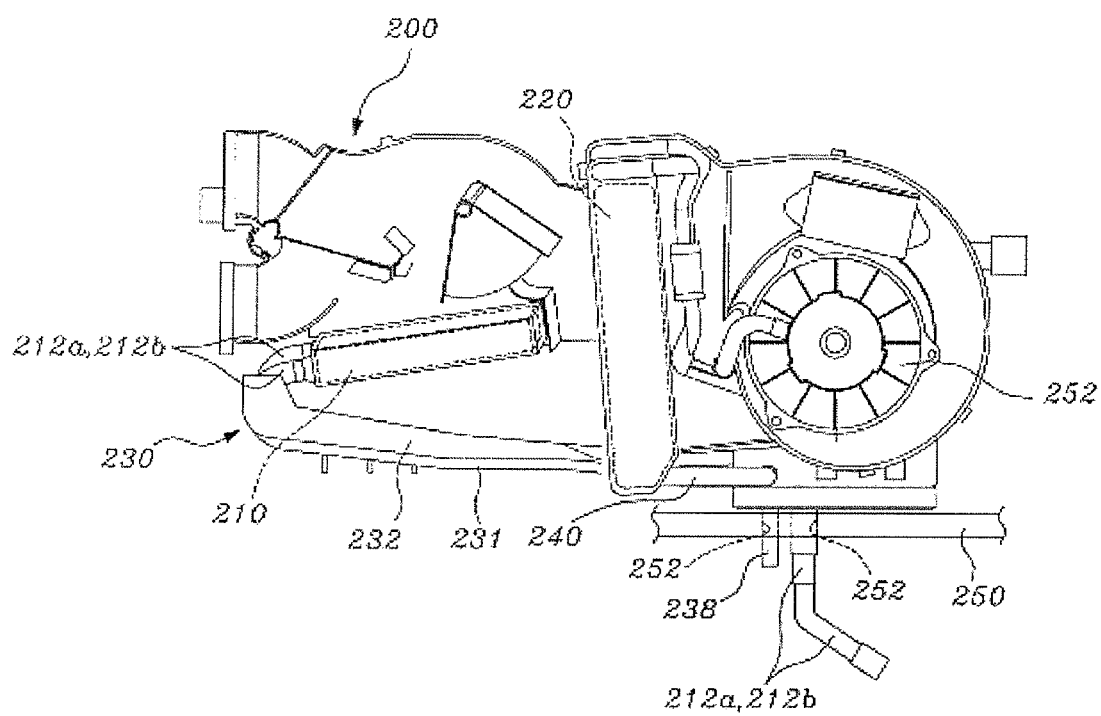
FIG. 3 is a side view of an air conditioning system for an automobile according to the present invention.
Figure 4:
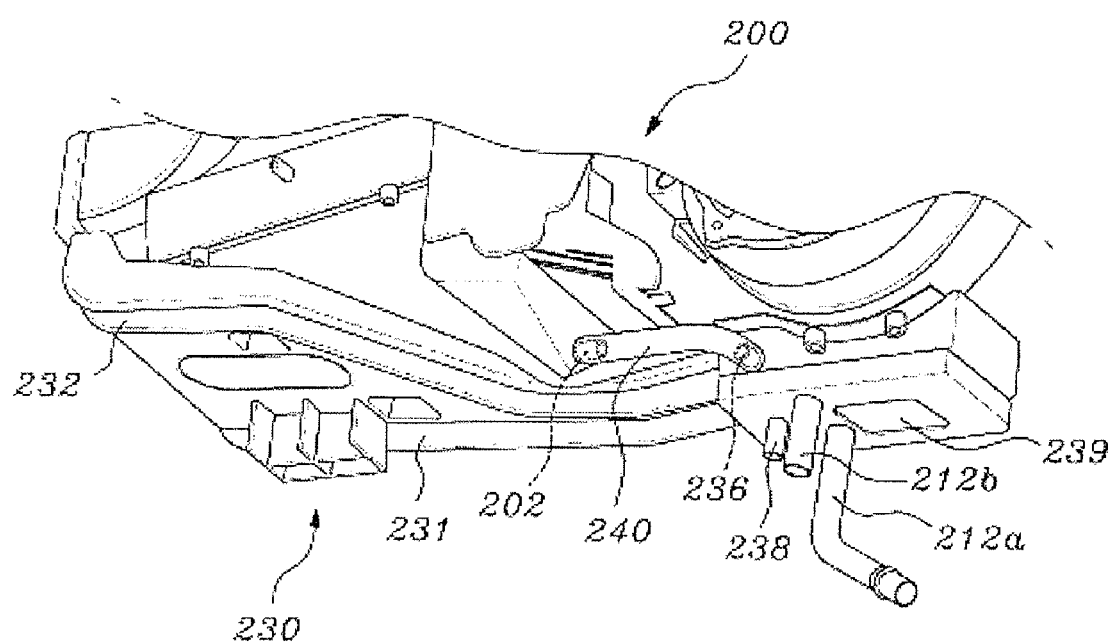
FIG. 4 is a partially perspective view showing a mounted structure of an air conditioning case and a protective cover of the air conditioning system for the automobile according to the present invention.
Figure 5:
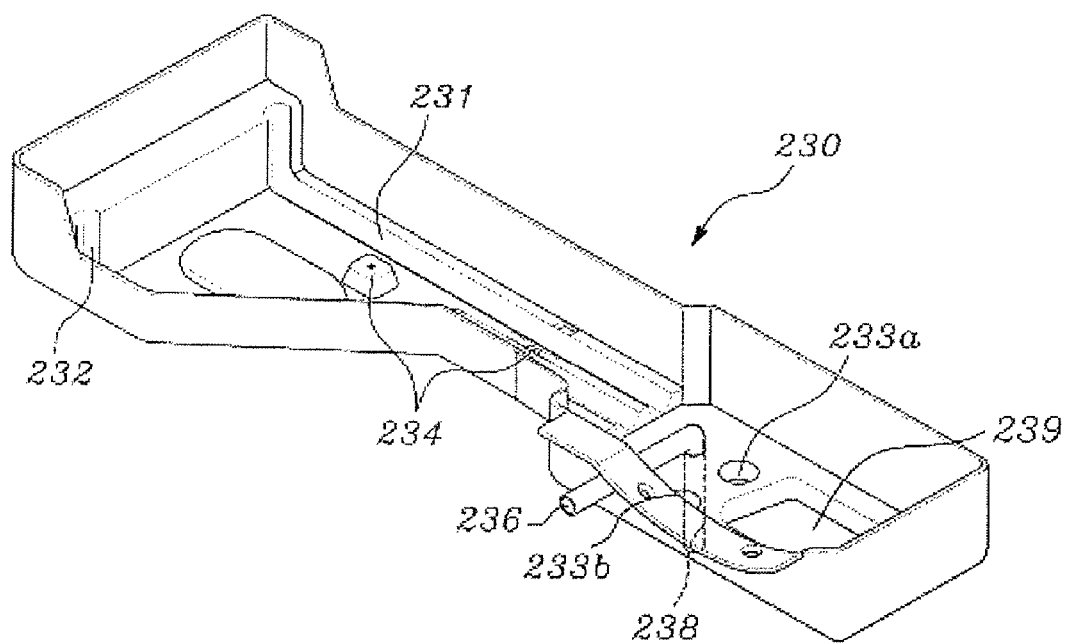
FIG. 5 is a perspective view of the protective cover mounted on the air conditioning case of the air conditioning system for the automobile according to the present invention.
Figure 6:
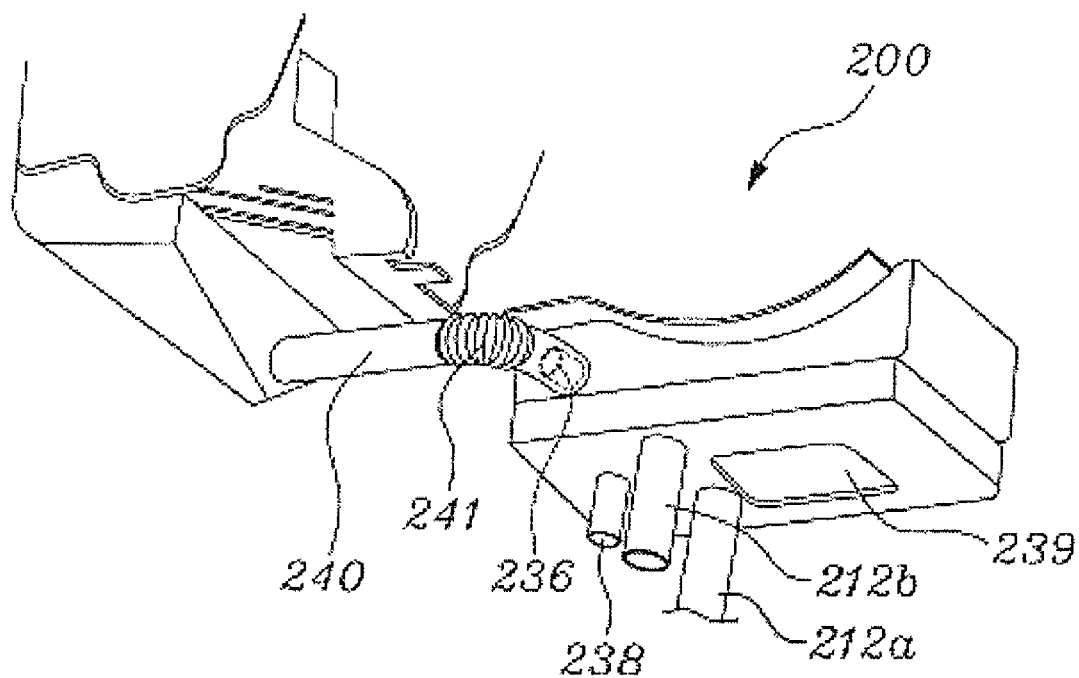
FIG. 6 is a perspective view of another example of the protective cover mounted on the air conditioning case of the air conditioning system for the automobile according to the present invention.

FIG. 3 is a side view of an air conditioning system for an automobile according to the present invention, FIG. 4 is a partially perspective view showing a mounted structure of an air conditioning case and a protective cover of the air conditioning system for the automobile according to the present invention, FIG. 5 is a perspective view of the protective cover mounted on the air conditioning case of the air conditioning system for the automobile according to the present invention, and FIG. 6 is a perspective view of another example of the protective cover mounted on the air conditioning case of the air conditioning system for the automobile according to the present invention.

As shown in FIGS. 3 to 5, the air conditioning system for the automobile according to the present invention, which includes an air conditioning case 200 having an air inlet formed on an entrance thereof, an air outlet formed on an exit end thereof, and a drain part 202 formed at a predetermined position of the lower part thereof for discharging condensed water; a heater core 210 and an evaporator 220 mounted on an air flow channel inside the air conditioning case 200 and having inflow and outflow pipes 212a and 212b of heat exchange medium, further includes: a protective cover 230 mounted on the bottom surface of the air conditioning case 200 for surrounding the inflow and outflow pipes 212a and 212b of the heater core 210 and having an auxiliary drain part 236 formed at a predetermined position of the side wall thereof; and a drain hose 240 for interconnecting the drain part 202 of the air conditioning case 200 with the auxiliary drain part 236 spaced apart from the drain part 202 at a predetermined interval.

The heater core 210 mounted at a predetermined position of the air flow channel inside the air conditioning case 200 has a tank part (not shown), and the two pipes 212a and 212b for allowing inflow and outflow of cooling water which is the heat exchange medium are respectively connected to the tank part of the heater core 210. Such inflow and outflow pipes 212a and 212b are drawn outwardly in predetermined form and length so as to be connected with an engine seated on a fixed position of an engine room of the automobile.

Moreover, when the outside air of low temperature is conditioned by the heat exchange medium inside the evaporator 220, condensed water is generated on the outer surface of the evaporator 220 while the outside air is condensed. The air conditioning system has a structure to collect the condensed water and discharge the condensed water to the outside of the automobile.

In addition, the protective cover 230 is mounted beneath the air conditioning case 200 for containing the inflow and outflow pipes 212a and 212b of the heater core 210 and has a condensed water discharge pipe 238 for easily discharging the condensed water generated when the evaporator 220 executes heat exchange inside the air conditioning case 200.

The protective cover 230 includes: first and second containing portions 231 and 232 inwardly bent at a predetermined position thereof for containing the inflow and outflow pipes 212a and 212b therein; a pair of guide holes 233a and 233b for guiding bent end portions of the inflow and outflow pipes 212a and 212b toward sides of the first and second containing portions 231 and 232 and exposing the inflow and outflow pipes 212a and 212b to the outside; the condensed water discharge pipe 238 vertically connecting with a side of the auxiliary drain part 236 so as to protrude outwardly; and a through hole 239 formed for exposing end portions of inflow and outflow pipes (not shown) of the evaporator 220 to the outside.

Furthermore, the first and second containing portions 231 and 232 formed at the predetermined position inside the protective cover 230 are bent downwardly and respectively have grooves formed in a predetermined length. The first and second containing portions 231 and 232 contain and surround the inflow and outflow pipes 212a and 212b of the heater core 210 which are drawn out from the air conditioning case 200, so that the inflow and outflow pipes 212a and 212b of the heater core 210 are not exposed outwardly from the protective cover 230. The protective cover 230 is fastened to a fastening portion 234 formed at a predetermined position of the lower part of the air conditioning case 200 via fastening means (not shown) such as a screw.

In addition, the inflow and outflow pipes 212a and 212b of the heater core 210 are bent in such a way that their end portions are drawn outwardly, and the end portions of the inflow and outflow pipes 212a and 212b are drawn to the outside through a pair of the guide holes 233a and 233b. As described above, the protective cover 230 contains the inflow and outflow pipes 212a and 212b of the heater core 210, thereby preventing the driver's injury, such as a burn.

Additionally, the auxiliary drain part 236 connected with the drain part 202 through the drain hose 240 is disposed at the predetermined position of the side wall of the protective cover 230, and the drain part 202 is perforated at the center thereof so as to be connected with the outside of the air conditioning case 200. The auxiliary drain part 236 formed on the protective cover 230 is also perforated at the center thereof like the drain part 202 so as to be connected with the outside.

Here, as shown in FIG. 4, the drain hose 240 is formed separately, but as shown in FIG. 5, may be formed integrally with the drain part 202 and the auxiliary drain part 236 when the protective cover 230 or the air conditioning case 200 is injection-molded. In the latter case, the drain hose 240 is extended from the drain part 202 or the auxiliary drain part 236 and has a bellows tube 241 formed at a central portion thereof.

Moreover, it is preferable that the drain part 202 is arranged at the same height as the auxiliary drain part 236 or at a higher position than the auxiliary drain part 236 so that the condensed water flows from the drain part 202 to the auxiliary drain part 236 by its self-weight.

Additionally, the auxiliary drain part 236 is so connected as to communicate with the condensed water discharge pipe 238 protruding outwardly in order to prevent dispersion of the condensed water and discharge the condensed water to the outside. That is, the condensed water discharged to the outside through the drain part 202 of the air conditioning case 200 passes through the drain hose 240 connecting the drain part 202 with the auxiliary drain part 236, and then, is discharged to the outside through the condensed water discharge pipe 238 perforated at the center thereof. The end portions of the inflow and outflow pipes 212a and 212b of the heater core 210 and the condensed water discharge pipe 238, which are contained in the protective cover 230, can directly protrude to the outside through an accommodating hole 252 of a panel

250 of the automobile, whereby the condensed water can be prevented from leakage without using a sealing member such as rubber.

The auxiliary drain part 236 formed on the side wall of the protective cover 230 and the condensed water discharge pipe 238 formed beneath the protective cover 230 are injection-molded integrally with the protective cover 230 and so connected as to communicate with each other, so that they are connected with the drain part 202 of the air conditioning case 200 via the drain hose 240 so as to discharge the condensed water to the outside of the automobile.

In addition, the condensed water discharge pipe 238 formed on the protective cover 230 directly protrudes the panel 250 of the automobile, so that the condensed water can be easily discharged to the outside of the automobile without mixing with the air flowing from the blower unit and dispersing inside the air conditioning case 200. So, the condensed water does not remain and is not decayed inside the air conditioning case 200, whereby the air conditioning system can provide the driver and passengers with the agreeable air conditioning environment.

As described above, preferred embodiments of the protective cover mounted on the air conditioning case of the air conditioning system for protecting the inflow and outflow pipes of the heater core are described, but the present invention is not restricted to the embodiments and applicable to a protective cover for protecting the inflow and outflow pipes of the evaporator.

As described above, the air conditioning system for the automobile according to the present invention can prevent leakage of condensed water, overcome restriction in layout, and increase productivity through reduction of manufacturing costs since the drain parts respectively formed on the air conditioning case and on the protective cover having the drain structure formed beneath the air conditioning case are connected and so connected as to communicate with each other via the drain hose.

In addition, the air conditioning system can provide the driver and passengers with the agreeable air conditioning environment since the condensed water discharge pipe is formed at a predetermined position of the protective cover to prevent dispersion of condensed water and easily discharge the condensed water to the outside of the automobile.

Further, even though a portion of the condensed water happens to be remained within the protective cover, the remained water can be easily and shortly dissipated with the heat generated from the heater core and, thus, malodor due to the remained condensed water for a long time can be decreased.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An air-conditioning system for an automobile, the system comprising:
    an air-conditioning case having an air inlet at an entrance of the case, an air outlet at an exit end of the case, and a drain part for discharging condensed water of the air-conditioning system therethrough, the drain part being at a predetermined position of a lower part of the case;
    a heater core and an evaporator mounted on an airflow channel inside the air conditioning case, the heater core and evaporator having inflow and outflow pipes for a coolant or refrigerant of the air-conditioning system, the inflow and outflow pipes extending outwardly from the air-conditioning case;
    a protective cover mounted on the bottom surface lower part of the air-conditioning case, the cover having (a) an auxiliary drain for condensed water of the air-conditioning system, (b) a discharge pipe for condensed water of the air-conditioning system, the auxiliary drain being at a side of the cover, the discharge pipe having one end connected with a side of the auxiliary drain and a second end that protrudes outwardly through the protective cover, and (c) guide holes or a through hole formed adjacent a side surface on which the discharge pipe for condensed water is formed, so that end portions of the inflow and outflow pipes are exposed to the outside and
    a drain hose connecting the drain part of the air-conditioning case with the auxiliary drain of the protective cover, the drain hose being arranged for coupling the condensed water between the drain part of the air-conditioning case and the drain part of the protective case,
    wherein the inflow and outflow pipes and the discharge pipe for condensed water directly protrude to the outside through an accommodating hole of a panel of the automobile.

2. An air conditioning system for an automobile according to claim 1, wherein the auxiliary drain part and the condensed water discharge pipe of the protective cover are connected to communicate with each other.

3. An air conditioning system for an automobile according to claim 1, wherein the auxiliary drain part and the condensed water discharge pipe are injection-molded integrally with the protective cover.

4. An air conditioning system for an automobile according to claim 1, wherein the drain hose is formed integrally with the drain part or the auxiliary drain part.

5. An air conditioning system for an automobile according to claim 1, wherein the drain part is arranged at the same height as the auxiliary drain part or at a higher position than the auxiliary drain part, such that the condensed water flows from the drain part to the auxiliary drain part with gravity.

6. An air conditioning system for an automobile according to claim 4, wherein the protective cover or the air conditioning case is injection-molded.

* * * * *